(12) United States Patent
Kersey et al.

(10) Patent No.: US 9,696,190 B2
(45) Date of Patent: Jul. 4, 2017

(54) ACOUSTIC PROBING TECHNIQUE FOR THE DETERMINATION OF MULTIPLE LIQUID/FROTH INTERFACES IN SEPARATION AND STORAGE VESSELS BASED ON AN OBLIQUE TOMOGRAPHIC ANALYSIS APPROACH

(75) Inventors: Alan D. Kersey, South Glastonbury, CT (US); John Viega, Ellington, CT (US)

(73) Assignee: CiDRA Corporate Services, Inc., Wallingford, CT (US)

( * ) Notice: Subject to any disclaimer, the term of this patent is extended or adjusted under 35 U.S.C. 154(b) by 427 days.

(21) Appl. No.: 14/240,519

(22) PCT Filed: Aug. 23, 2012

(86) PCT No.: PCT/US2012/052074
§ 371 (c)(1),
(2), (4) Date: May 21, 2014

(87) PCT Pub. No.: WO2013/028870
PCT Pub. Date: Feb. 28, 2013

(65) Prior Publication Data
US 2015/0047438 A1    Feb. 19, 2015

Related U.S. Application Data

(60) Provisional application No. 61/526,336, filed on Aug. 23, 2011.

(51) Int. Cl.
*G01F 23/296* (2006.01)
*G01F 1/66* (2006.01)

(52) U.S. Cl.
CPC .......... *G01F 1/66* (2013.01); *G01F 23/2965* (2013.01)

(58) Field of Classification Search
CPC ............................ G01F 1/66; G01F 23/2965
(Continued)

(56) References Cited

U.S. PATENT DOCUMENTS 3,499,154 A * 3/1970 Boyd ................... G01F 23/292
                                                                        250/338.1
4,328,707 A    5/1982 Clement et al.
(Continued)

OTHER PUBLICATIONS

Multi-Scale Structural Simulations Laboratory. Jul. 3, 2008. University of Michigan, [retrieved on Nov. 19, 2012]. Retrieved from the Internet: <http://web.archive.org/beb/20080703152503/http://www-personal.umich.edu/~veeras/projects/projects_nde.html>.

(Continued)

*Primary Examiner* — J M Saint Surin
(74) *Attorney, Agent, or Firm* — Ware, Fressola, Maguire & Barber LLP

(57) ABSTRACT

Apparatus is provided featuring a signal processor configured to receive from an array of ultrasonic transponders around a tank, container or flow pipe signaling containing information about acoustic waves of energy penetrating a fluid in the tank, container or flow pipe; and determine using tomography a three-dimensional image of layers of the fluid in the tank, container or flow pipe based at least partly on the signalling received and. The signal processor provides corresponding signal containing information about the three-dimensional image of the layers of the fluid in the tank, container or flow pipe. The array is an obliquely oriented array of ultrasonic transponders arranged on an oblique plane to the axis of the tank or column; or the array is placed normal to the flow around the exterior of the flow pipe.

44 Claims, 3 Drawing Sheets

(58) Field of Classification Search
USPC .................................................. 73/861.18
See application file for complete search history.

(56) References Cited

U.S. PATENT DOCUMENTS

| | | | |
|---|---|---|---|
| 4,386,854 A | 6/1983 | Byer | |
| 5,181,778 A | 1/1993 | Beller | |
| 5,363,848 A | 11/1994 | Spani et al. | |
| 6,078,397 A | 6/2000 | Monchalin et al. | |
| 6,098,466 A * | 8/2000 | Shkarlet | A61B 8/06 73/861.25 |
| 6,530,278 B1 * | 3/2003 | Bowersox | B23K 31/12 73/623 |
| 6,535,835 B1 * | 3/2003 | Rubin | A61B 8/06 702/159 |
| 6,883,386 B2 * | 4/2005 | Osone | G01F 1/662 73/861.25 |
| 7,225,727 B2 * | 6/2007 | Oldani | A47J 31/44 99/293 |
| 7,367,226 B2 * | 5/2008 | Okamura | G01F 23/284 250/357.1 |
| 8,794,080 B2 * | 8/2014 | Mueller | G01F 1/662 73/861.27 |
| 8,959,998 B2 * | 2/2015 | Birtcher | G01F 23/2961 73/290 V |
| 2007/0027638 A1 | 2/2007 | Fernald et al. | |
| 2008/0236275 A1 * | 10/2008 | Breed | B60C 11/24 73/290 V |
| 2008/0250869 A1 * | 10/2008 | Breed | B60C 11/24 73/861.27 |
| 2010/0257931 A1 | 10/2010 | Partington et al. | |
| 2012/0007743 A1 * | 1/2012 | Solomon | G01M 3/243 340/605 |
| 2012/0273191 A1 * | 11/2012 | Schmidt | E21B 47/122 166/250.1 |

OTHER PUBLICATIONS

Oil Sands. Jul. 24, 2011. Energy Minerals Division. [retrieved on Nov. 19, 2012]. Retrieved from the Internet: <http://web.archive.org/web/20110724213145/http://emd.aapg.org/technical_areas/oil_sands.cfm>.

* cited by examiner

Apparatus 10 comprising:

a signal processor 12 configured to 12a, receive signaling containing information about waves of energy penetrating a fluid in a tank, container of flow pipe 12b, determine an image of layers of the fluid in the tank, container or flow pipe based at least partly on the signaling received 12c, provide corresponding signal containing information about the image of the layers of the fluid in the tank, container or flow pipe 12d, other signal processing functionality

*FIG. 3*: The Basic Apparatus

Apparatus 20 comprising:

a signal processor 22 configured to 22a, receive from an array of ultrasonic transponders around a tank, container or flow pipe signaling containing information about acoustic waves of energy penetrating a fluid in the tank, container or flow pipe 22b, determine using tomography a three-dimensional image of layers of the fluid in the tank, container or flow pipe based at least partly on the signaling received 22c, provide corresponding signal containing information about the three-dimensional image of the layers of the fluid in the tank, container or flow pipe 22d, other signal processing functionality

*FIG. 4*: The Apparatus

ACOUSTIC PROBING TECHNIQUE FOR THE DETERMINATION OF MULTIPLE LIQUID/FROTH INTERFACES IN SEPARATION AND STORAGE VESSELS BASED ON AN OBLIQUE TOMOGRAPHIC ANALYSIS APPROACH

CROSS-REFERENCE TO RELATED APPLICATIONS

This application corresponds to international patent application serial no. PCT/US2012/052074, filed 23 Aug. 2012, which claims benefit to provisional patent application Ser. No. 61/526,336, filed 23 Aug. 2011, which is incorporated by reference in its entirety.

BACKGROUND OF THE INVENTION

1. Field of Invention

The present invention relates to a technique for determining information about layers of a fluid in a tank, container or flow pipe.

2. Description of Related Art

In many industrial applications, it is important to understand the levels inside storage tanks, and in particular, in multiphase applications, the differences in height of the layers in a tank—e.g., water, oil, foam boundary layers. This can be very important in, for example, mineral and bitumen separation tanks.

SUMMARY OF THE INVENTION

According to some embodiments of the present invention, a tomographic technique is applied to a storage/processing vessel for this application that uses, e.g., an obliquely oriented array of ultrasonic transponders around a tank to determine the interstitial layers in the tank. Tomographic techniques can be applied to flow pipes to visualize multiphase flow. Electrical resistance and capacitance techniques are often used, but ultrasonic probing can also be used. In a pipe, the array of transducers is placed normal to the flow around the pipe exterior. If this is done in a storage vessel, the system would visualize one layer in the tank; however, if the array is positioned obliquely, it can be used to sense diagonally across the storage tank and give a measure of the different fluid layers in the tank.

The Basic Apparatus

According to some embodiments, the present invention may include, or take the form of, apparatus comprising a signal processor configured to receive signaling containing information about waves of energy penetrating a fluid in a tank, container or flow pipe; and determine an image of layers of the fluid in the tank, container or flow pipe based at least partly on the signalling received.

The present invention may include one or more of the following features:

The signal processor may be configured to provide corresponding signal containing information about the image of the layers of the fluid in the tank, container or flow pipe.

The signaling may be received from an array of ultrasonic transponders configured on, or in relation to, the tank, container or flow pipe.

The signaling may be received from an obliquely oriented array of ultrasonic transponders around the tank or container.

The apparatus may further comprise the obliquely oriented array of ultrasonic transponders around the tank or container, including using twelve ultrasonic transponders.

The obliquely oriented array of ultrasonic transponders may be arranged on an oblique plane to the axis of the tank or column.

Each ultrasonic transducer may be configured to send respective signaling to other ultrasonic transducers in sequence, and an acoustic propagation between the ultrasonic transponders indicates an acoustic continuity between the ultrasonic transponders.

Each ultrasonic transponder may include a transmitter and receiver.

The signal processor may be configured to determine interstitial layers of the fluid in the tank, container or flow pipe.

The signal processor is configured to determine differences in height of the layers of the fluid in the tank, container or flow pipe.

The layers may include water, oil or foam boundary layers of the fluid in the tank, container or pipe.

The image may contain information to visualize multiphase flow in the flow pipe.

The signaling may be received from an array of ultrasonic transducers placed normal to the flow around the exterior of the flow pipe.

The signaling may be received from multiple obliquely oriented array of ultrasonic transponders around the tank or container and used to sense multiple "cut through planes" of the tank or contain.

The image may be a three-dimensional image.

The signal processor may be configured to determine the image based at least partly on differences in effects on the passage of the waves of energy impinging on the layers of the fluid in the tank, container or flow pipe.

The tank or container may be a mineral and bitumen separation tank.

The signal processor may be configured to determine multiple liquid/froth interfaces in separation and storage vessels.

The image of the layers is a tomographic image having multiple liquid/froth interfaces in a separation and storage vessel.

The signal processor may be configured to determine the image based at least partly on a tomographic analysis, including an oblique tomographic analysis.

According to some embodiments, the present invention may include, or take the form of, the signal processor configured to receive from an array of ultrasonic transponders arranged around a tank, container or flow pipe signaling containing information about acoustic waves of energy penetrating a fluid in the tank, container or flow pipe; and determine using tomography a three-dimensional image of layers of the fluid in the tank, container or flow pipe based at least partly on the signalling received. In this embodiment, the signal processor may also be configured to provide corresponding signal containing information about the three-dimensional image of the layers of the fluid in the tank, container or flow pipe; or the array may be an obliquely oriented array of ultrasonic transponders arranged on an oblique plane to the axis of the tank or column; or the array may be placed normal to the flow around the exterior of the flow pipe.

According to some embodiments, the present invention may include, or take the form of, apparatus comprising means for receiving in a signal processor signaling containing information about waves of energy penetrating a fluid in a tank, container or flow pipe, consistent with that disclosed herein; and means for determining in the signal processor an image of layers of the fluid in the tank, container or flow pipe based at least partly on the signalling received, consistent with that disclosed herein. Further, the apparatus may comprise means for providing corresponding signal containing information about the image of the layers of the fluid in the tank, container or flow pipe, consistent with that disclosed herein.

The Method

According to some embodiments, the present invention may include, or take the form of, a method comprising receiving in the signal processor signaling containing information about waves of energy penetrating a fluid in a tank, container or flow pipe; and determining in the signal processor an image of layers of the fluid in the tank, container or flow pipe based at least partly on the signalling received.

The method may also be implemented having one or more of the other features set forth herein.

BRIEF DESCRIPTION OF THE DRAWING

The drawing includes FIGS. 1-4, which are not necessarily drawn to scale, as follows:

FIG. 3 is a block diagram of apparatus having a signal processor to implement functionality according to some embodiments of the present invention.

FIG. 4 is a block diagram of apparatus having a signal processor to implement functionality according to some embodiments of the present invention.

DETAILED DESCRIPTION OF BEST MODE OF THE INVENTION

Figure 1:
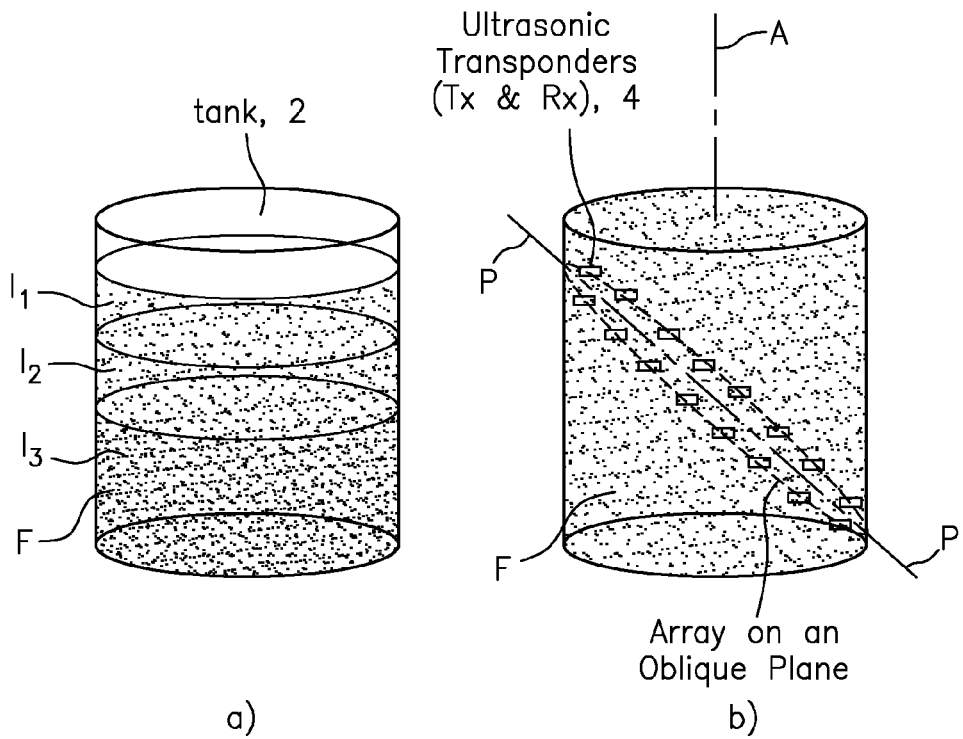
FIG. 1 includes FIG. 1a that illustrates a tank having a fluid with various fluid levels, and includes FIG. 1b that illustrates the basic concept of the present invention where the tank having the fluid with the various fluid levels is configured with an array of ultrasonic transducers (Tx and Rx) arranged on an oblique plane with respect to the axis of the tank or column, according to some embodiments of the present invention.

FIG. 1: The Basic Apparatus

Figure 2:
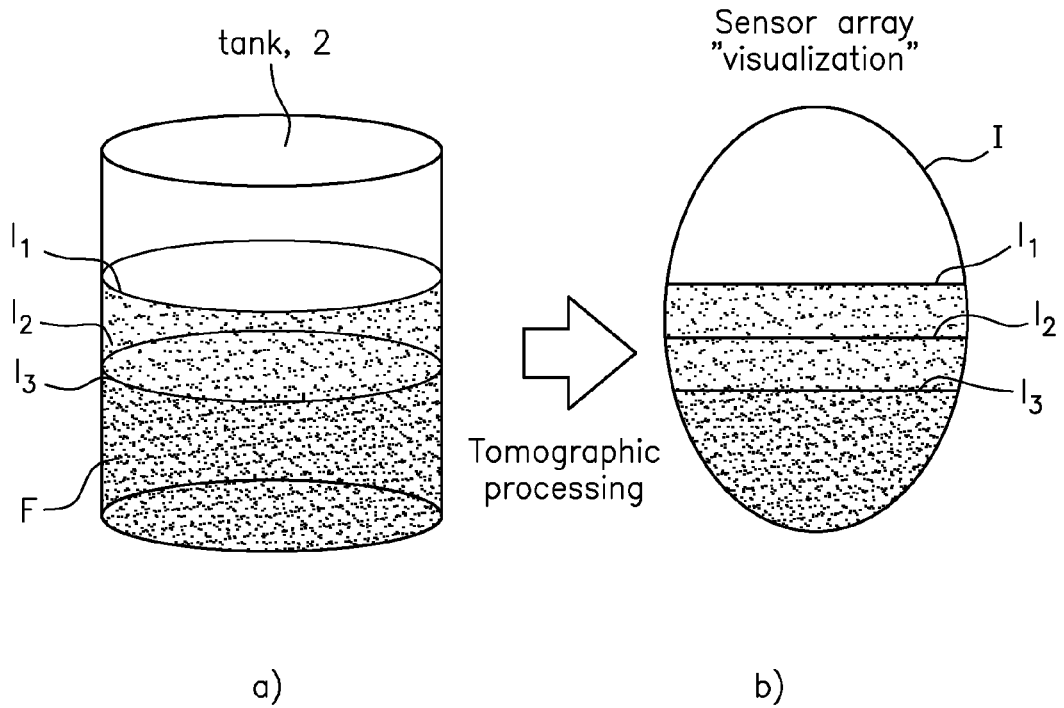
FIG. 2 includes FIG. 2a that illustrates the tank having the fluid with the various fluid levels, and includes FIG. 2b that illustrates the principle of operation of the present invention where tomographic processing is used to provide a sensor array "visualization" of the fluid levels in the tank, according to some embodiments of the present invention.

FIGS. 1 and 2 respectively indicate the concept and the principle of operation: In FIG. 1, a tank, container or storage vessel 2 is illustrated with an array 3 or a number of transponders or transponder devices 4 placed along an oblique plane P to the axis A of the tank 2. By way of example, each transducer 4 may be configured to include a transmitter Tx and a receiver Rx, and the number may nominally include twelve (12) transponders 4 placed on the oblique plane P. Each transducer 4 is configured to send signals or signaling to the other transponders in sequence, and the acoustic propagation between the transponders 4 indicates the acoustic continuity between the transponder devices 4. This continuity is affected/perturbed by the levels or layers $I_1, I_2, I_3, \ldots, I_n$ of the fluid F in the tank 2. Processing allows for visualization of the layers, consistent with that set forth in relation to FIGS. 3-4. It is important to note that the scope of the invention is not intended to be limited to any particular number of transponders; and embodiments are envisioned having more than 12 transponders, as well as having fewer than 12 transponders.

FIG. 3

FIG. 3 shows by way of example the basic apparatus 10 for implementing the functionality according to the present invention, consistent with that set forth herein, e.g., using a signal processor 12 configured to receive signaling containing information about waves of energy penetrating the fluid F in the tank 2, container or flow pipe, e.g. in a signal processor module 12a; and also configured to determine an image I of layers $I_1, I_2, I_3, \ldots, I_n$ of the fluid F in the tank 2, container or flow pipe based at least partly on the signalling received, e.g. in a signal processor module 12b. The signal processor 12 may also be configured to provide corresponding signal containing information about the image I of the layers $I_1, I_2, I_3, \ldots, I_n$ of the fluid F in the tank, container or flow pipe, e.g. in a signal processor module 12c. This corresponding signal may be used to display the image I in some manner, e.g., on a monitor, in a photograph, etc. The scope of the invention is not intended to be limited to the type or kind of display, or the manner of displaying the image I, either now known or later developed in the future.

The signal processor 12 may be configured to receive the signaling from an obliquely oriented array 3 of ultrasonic transponders 4 around the tank or container 2, consistent with that shown in FIG. 1 b. The obliquely oriented array 3 of ultrasonic transponders 4 may be arranged on the oblique plane P to the axis A of the tank 2 or column, consistent with that shown in FIG. 1 b.

The signal processor 12 may be configured to use a tomographic technique in order to determine information about the layers $I_1, I_2, I_3, \ldots, I_n$ of the fluid F in the tank 2, including the image I of the layers $I_1, I_2, I_3, \ldots, I_n$ of the fluid F in the tank 2. By way of further example, the signal processor 12 may be configured to determine the number of the interstitial layers $I_1, I_2, I_3, \ldots, I_n$ of the fluid F in the tank 2, or to determine density characteristics (e.g., water, oil, foam) about the interstitial layers $I_1, I_2, I_3, \ldots, I_n$, or to determine differences in height of the layers $I_1, I_2, I_3, \ldots, I_n$ of the fluid F in the tank 2. The layers $I_1, I_2, I_3, \ldots, I_n$ may include layers of water, oil or foam boundary layers of the fluid F in the tank 2, e.g., similar to that typically found in a mineral and bitumen separation tank.

Moreover, the signal processor 12 may be implemented according to some embodiments of the present invention to provide an acoustic probing technique for determination of multiple liquid/froth interfaces in separation and storage vessels based on an oblique tomographic analysis approach, consistent with that set forth herein.

The signal processor 12 may also be configured with a signal processor module 12d to implement other types or kinds of functionality, which do not form part of the underlying invention, and are thus not described in detail herein, including input/output functionality, and/or memory and addressing functionality, etc.

FIG. 4

FIG. 4 shows by way of example the basic apparatus 20 for implementing the functionality according to the present invention, consistent with that set forth herein, e.g., using a signal processor 22 configured to receive from the array A of ultrasonic transponders 4 around the tank 2, container or flow pipe signaling containing information about acoustic waves (e.g. ultrasonic waves) of energy penetrating the fluid F in the tank 2 shown in FIG. 1b, e.g. in a signal processor module 22a; and determine using tomography or tomographic processing a three-dimensional image (e.g. image I in FIG. 2b) of layers $I_1, I_2, I_3, \ldots, I_n$ of the fluid F in the tank 2, based at least partly on the signalling received, e.g. in a signal processor module 22b. The signal processor 22 may also be configured to provide corresponding signal containing information about the three-dimensional image of the layers of the fluid in the tank, container or flow pipe, e.g. in a signal processor module 22c.

The signal processor 22 may also be configured with a signal processor module 22d to implement other types or kinds of functionality, which does not form part of the underlying invention, and is thus not described in detail herein, including input/output functionality, memory and addressing functionality, etc.

Tomography or Tomographic Processing

Tomography or tomographic processing is known in the art, and generally understood to refer to imaging by sections or sectioning, through the use of any kind of penetrating wave. A device used in tomography is called a tomograph, while the image produced is a tomogram. The method or technique is used, e.g., in radiology, archeology, biology, geophysics, oceanography, materials science, astrophysics, quantum information and other sciences. In most cases, it is based on the mathematical procedure called tomographic reconstruction. Tomographic reconstruction algorithms are known in the art for determining the imaging by sections or sectioning, through the use of any kind of penetrating wave. By way of example, the reader is referred to U.S. Pat. Nos. 6,078,397; 5,181,778; 4,386,854; and 4,328,707, which all relate to tomographic techniques and are all incorporated by reference in their entirety. The scope of the invention is not intended to be limited to the type or kind of tomographic reconstruction algorithms, including those based at least partly on using ultrasonic waves, either now known or later developed in the future.

Signal Processors 12, 22

By way of example, and consistent with that described herein, the functionality of the signal processor 12 and/or the signal processor or processing modules 12a, 12b, 12c, 12d, and the signal processor 22 and/or the signal processor or processing modules 22a, 22b, 22c, 22d may include and be implemented by a signal processing or processor device that may be configured to receive signaling, signals or a signal, process the signaling, the signals or the signal, and/or provide corresponding signaling, signals, or a corresponding signal, using hardware, software, firmware, or a combination thereof, although the scope of the invention is not intended to be limited to any particular embodiment thereof. In a typical software implementation, the signal processor may include, or take the form of, one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor as either part of the aforementioned devices, as a stand alone module, or in the combination with other circuitry for implementing another module.

It is also understood that the apparatus 10, 20 (FIGS. 3-4) may include one or more other modules like signal processor module 12d, 22d, components, processing circuits, or circuitry for implementing other signal processing functionality associated with the underlying apparatus 10, 20 that does not form part of the underlying invention, and thus is not described in detail herein. By way of example, the one or more other modules like signal processor module 12d, 22d, components, processing circuits, or circuitry may include random access memory, read only memory, input/output circuitry and data and address buses for use in relation to implementing the signal processing functionality of the signal processor, or devices or components, etc.

Applications

The present invention may also be used in, or form part of, or used in conjunction with, industrial processes like a mineral extraction processing system for extracting minerals from ore either now known or later developed in the future, including any mineral process, such as those related to processing substances or compounds that result from inorganic processes of nature and/or that are mined from the ground, as well as including either other extraction processing systems or other industrial processes, where the determining information about layers of a fluid in a tank, container or flow pipe is critical to overall industrial process performance. By way of example, embodiments are envisioned related to oilsands processing, since knowing where the interface density layers are between the various constituencies in a settling vessel is key to controlling the process.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus comprising:
a signal processor configured to
receive signaling containing information about waves of energy penetrating a fluid in a tank, container or flow pipe; and
determine an image of layers of the fluid in the tank, container or flow pipe based at least partly on the signaling received, wherein the signaling is received from an array of ultrasonic transponders configured on, or in relation to, the tank, container or flow pipe, each transponder located at a position and wherein each ultrasonic transponder is configured to send respective signaling to other ultrasonic transponder at a different position in sequence, and an acoustic propagation between the ultrasonic transponders indicates an acoustic continuity between the ultrasonic transponders, wherein the different position is a different height in relation to the tank or container or a different flow location in relation to the flow pipe.

2. Apparatus according to claim 1, wherein the signal processor is configured to provide corresponding signal containing information about the image of the layers of the fluid in the tank, container or flow pipe.

3. Apparatus according to claim 1, wherein the signal processor is configured to determine the image based at least partly on a tomographic analysis, including an oblique tomographic analysis.

4. Apparatus according to claim 1, wherein the array of ultrasonic transponders is an obliquely oriented-array of ultrasonic transponders around the tank or container.

5. Apparatus according to claim 4, wherein the obliquely oriented array of ultrasonic transponders around the tank or container includes twelve ultrasonic transponders.

6. Apparatus according to claim 4, wherein the obliquely oriented array of ultrasonic transponders is arranged on an oblique plane to the axis of the tank or column.

7. Apparatus according to claim 4, wherein each ultrasonic transponder comprises a transmitter and receiver.

8. Apparatus according to claim 1, wherein the signal processor is configured to determine interstitial layers of the fluid in the tank, container or flow pipe.

9. Apparatus according to claim 1, wherein the signal processor is configured to determine differences in height of the layers of the fluid in the tank, container or flow pipe.

10. Apparatus according to claim 1, wherein the layers include water, oil or foam boundary layers of the fluid in the tank, container or pipe.

11. Apparatus according to claim 1, wherein the image contains information to visualize multiphase flow in the flow pipe.

12. Apparatus according to claim 1, wherein the an array of ultrasonic transducers is placed normal to the flow around the exterior of the flow pipe.

13. Apparatus according to claim 1, wherein the signaling is received from multiple obliquely oriented array of ultrasonic transponders around the tank or container and used to sense multiple "cut through planes" of the tank or contain.

14. Apparatus according to claim 1, wherein the image is a three-dimensional image.

15. Apparatus according to claim 1, wherein the signal processor is configured to determine the image based at least partly on differences in effects on the passage of the waves of energy impinging on the layers of the fluid in the tank, container or flow pipe.

16. Apparatus according to claim 1, wherein the tank or container is a mineral and bitumen separation tank.

17. Apparatus according to claim 1, wherein the signal processor is configured to determine multiple liquid/froth interfaces in separation and storage vessels.

18. Apparatus according to claim 1, wherein the signal processor is configured to
receive from the array of ultrasonic transponders arranged around a tank, container or flow pipe the signaling containing information about acoustic waves of energy penetrating the fluid in the tank, container or flow pipe; and
determine using tomography a three-dimensional image of the layers of the fluid in the tank, container or flow pipe based at least partly on the signaling received.

19. Apparatus according to claim 18, wherein the signal processor is configured to provide the corresponding signal containing information about the three-dimensional image of the layers of the fluid in the tank, container or flow pipe.

20. Apparatus according to claim 18, wherein the array is an obliquely oriented array of ultrasonic transponders arranged on an oblique plane to the axis of the tank or column.

21. Apparatus according to claim 20, wherein the apparatus further comprises the obliquely oriented array of ultrasonic transponders.

22. Apparatus according to claim 18, wherein the array is placed normal to the flow around the exterior of the flow pipe.

23. A method comprising:
receiving in a signal processor signaling containing information about waves of energy penetrating a fluid in a tank, container or flow pipe; and
determining in the signal processor an image of layers of the fluid in the tank, container or flow pipe based at least partly on the signaling received, wherein the signaling is received from an array of ultrasonic transponders configured on, or in relation to, the tank, container or flow pipe, each ultrasonic transponder located at a position, and wherein each ultrasonic transponder is configured to send respective signaling to other ultrasonic transponder at a different position in sequence, and an acoustic propagation between the ultrasonic transponders indicates an acoustic continuity between the ultrasonic transponders, wherein the different position is a different height in relation to the tank or container or a different flow location in relation to the flow pipe.

24. A method according to claim 23, wherein the method comprises providing with the signal processor corresponding signal containing information about the image of the layers of the fluid in the tank, container or flow pipe.

25. A method according to claim 23, wherein the array of ultrasonic transponders is an obliquely oriented array of ultrasonic transponders around the tank or container.

26. A method according to claim 25, wherein the method further comprises providing the signaling from the obliquely oriented array of ultrasonic transponders around the tank or container, including using twelve ultrasonic transponders.

27. A method according to claim 25, wherein the obliquely oriented array of ultrasonic transponders is arranged on an oblique plane to the axis of the tank or column.

28. A method according to claim 25, wherein each ultrasonic transponder comprises a transmitter and receiver.

29. A method according to claim 23, wherein the method further comprises determining with the signal processor interstitial layers of the fluid in the tank, container or flow pipe.

30. A method according to claim 23, wherein the method further comprises determining with the signal processor differences in height of the layers of the fluid in the tank, container or flow pipe.

31. A method according to claim 23, wherein the layers include water, oil or foam boundary layers of the fluid in the tank, container or pipe.

32. A method according to claim 23, wherein the image contains information to visualize multiphase flow in the flow pipe.

33. A method according to claim 23, wherein the an array of ultrasonic transducers is placed normal to the flow around the exterior of the flow pipe.

34. A method according to claim 23, wherein the method further comprises receiving the signaling from multiple obliquely oriented array of ultrasonic transponders around the tank or container and used to sense multiple "cut through planes" of the tank or contain.

35. A method according to claim 23, wherein the image is a three-dimensional image.

36. A method according to claim 23, wherein the method further comprises determining with the signal processor the image based at least partly on differences in effects on the passage of the waves of energy impinging on the layers of the fluid in the tank, container or flow pipe.

37. A method according to claim 23, wherein the tank or container is a mineral and bitumen separation tank.

38. A method according to claim 23, wherein the signal processor is configured to determine multiple liquid/froth interfaces in separation and storage vessels.

39. A method according to claim 23, wherein the method comprises receiving the signaling from an array of ultrasonic transponders configured on, or in relation to, the tank, container or flow pipe.

40. A method according to claim 23, wherein the signal processor is configured to determine the image based at least partly on a tomographic analysis, including an oblique tomographic analysis.

41. Apparatus comprising:
means for receiving in a signal processor signaling containing information about waves of energy penetrating a fluid in a tank, container or flow pipe; and
means for determining in the signal processor an image of layers of the fluid in the tank, container or flow pipe based at least partly on the signaling received, wherein the signaling is received from an array of ultrasonic transponders configured on, or in relation to, the tank, container or flow pipe, each ultrasonic transponder located at a position, and wherein each ultrasonic transponder is configured to send respective signaling to other ultrasonic transponder at a different position in sequence, and an acoustic propagation between the ultrasonic transponders indicates an acoustic continuity between the ultrasonic transponders, wherein the different position is a different height in relation to the tank or container or a different flow location in relation to the flow pipe.

42. Apparatus according to claim 41, wherein the apparatus further comprises means for providing corresponding signal containing information about the image of the layers of the fluid in the tank, container or flow pipe.

43. Apparatus according to claim 41, wherein the means for determining determines the image based at least partly on a tomographic analysis, including an oblique tomographic analysis.

44. Apparatus according to claim 41, wherein the means for receiving receives the signaling from an array of ultrasonic transponders configured on, or in relation to, the tank, container or flow pipe.

* * * * *